United States Patent [19]

Gabb et al.

[11] 4,241,038

[45] Dec. 23, 1980

[54] REDUCTION OF FERRIC CHLORIDE

[75] Inventors: Philip J. Gabb; Hayden Monk; John Lumsden, all of Bristol, England

[73] Assignee: Mineral Process Licensing Corporation BV, The Hague, Netherlands

[21] Appl. No.: 37,681

[22] Filed: May 10, 1979

[30] Foreign Application Priority Data

May 16, 1978 [GB] United Kingdom ............... 19987/78

[51] Int. Cl.³ .............................................. C01G 94/10
[52] U.S. Cl. .................................... 423/493; 423/469; 423/79
[58] Field of Search ................... 423/493, 79, 469, 493, 423/500, 568, 633

[56] References Cited

U.S. PATENT DOCUMENTS

| 3,690,828 | 9/1972 | Baetz et al. | 423/149 |
| 4,140,746 | 2/1979 | Turner et al. | 423/79 |

FOREIGN PATENT DOCUMENTS 1522065  5/1968  France.

*Primary Examiner*—Earl C. Thomas
*Attorney, Agent, or Firm*—Barry G. Magidoff

[57] ABSTRACT

The invention relates to a method for the reduction of ferric chloride to produce ferrous chloride. The method involves using as the reducing agent sulphur monochloride optionally in combination with sulphur or sulphur dichloride to produce ferrous chloride and sulphur dichloride. The sulphur monochloride may be introduced as a gas or as a liquid and the reaction is conveniently performed in a fluidized bed. According to a particular aspect, the ferric chloride reduction forms part of a process for the recovery of chlorine values from iron chloride by-produced by industrial processes such as the chlorination of a titaniferous or aluminous material.

11 Claims, No Drawings

REDUCTION OF FERRIC CHLORIDE

This invention relates to the reduction of ferric chloride to produce ferrous chloride.

According to a particular embodiment, this invention relates to an improved method of reducing ferric chloride to produce ferrous chloride as part of a process for the recovery of the chlorine values from iron chloride. U.S. Pat. No. 4,140,746 describes a process for the recovery of the chlorine values from iron chloride by-produced from the chlorination of a titaniferous material such as ilmenite. U.S. patent application No. 37,718, filed Aug. 10, 1979, describes a similar process for the recovery of the chlorine values from iron chloride by-produced from the chlorination of an aluminous material such as bauxite.

These processes involve recovering the chlorine values from iron chloride employing three steps:

(a) subjecting ferric chloride to a partial dechlorination in the presence of one or more suitable reducing agents to produce ferrous chloride and a chloride compound;

(b) subjecting ferrous chloride to an oxidation reaction with oxygen or air to produce ferric chloride and ferric oxide;

(c) recycling the resulting ferric chloride to the partial dechlorination stage (a).

Thus, according to these processes the chlorine values are recovered from the iron chloride starting material during the partial dechlorination stage (a) in which ferric chloride is reduced to ferrous chloride, using a suitable reducing agent.

A suitable reducing agent in the context of these inventions was defined as being one that meets the two following criteria: first that it is effective in dechlorinating ferric chloride to ferrous chloride; second, that in reaction with ferric chloride, it produces a chloride compound which, directly or after further processing, is either suitable for recycle to the chlorination process (if appropriate) or has other industrial utility.

Of the various reducing agents described as suitable in the U.S. Pat. No. 4,140,746 and U.S. patent application No. 37,718, filed Aug. 10, 1979, the use of liquid sulphur in reaction with solid ferric chloride was particularly exemplified. This reaction is summarised in equation (1) below:

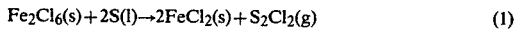

(where s represents solid, l represents liquid and g represents gas)

Although the reaction method summarised in equation (1) is effective, it nevertheless is accompanied by certain problems. Thus, the liquid-solid reaction between sulphur and ferric chloride requires complicated equipment, and the need to condense the gaseous ferric chloride from the oxidation stage (b) so as to be able to feed solid ferric chloride to the reaction summarised in equation (1) further adds to costs.

Furthermore, the recovery of elemental chlorine from sulphur monochloride produced in accordance with the reaction shown in equation (1), which is desirable unless the sulphur monochloride can be recycled directly to the process which by-produced the iron chloride in the first place, preferably involves two stages of distillation with high reflux ratios in the first stage.

We have now found a method of obviating these problems.

Thus, the present invention provides a method for the reduction of ferric chloride to produce ferrous chloride which comprises reducing ferric chloride in the presence of sulphur monochloride. The reaction according to the invention is exemplified in equation (2) below:

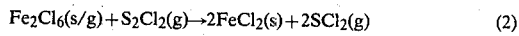

The feasibility of the method summarised in equation (2) is contrary to the indications of the literature in that sulphur monochloride is conventionally regarded as a product of ferric chloride reduction, as illustrated in equation (1), and not as an input. The reduction of ferric chloride with sulphur to produce sulphur monochloride and ferrous chloride is a well known reaction and it is, therefore, surprising to go beyond the formation of sulphur monochloride in the reduction of ferric chloride, particularly in view of the fact that sulphur dichloride ($SCl_2$) is thought to be unstable at temperatures consistent with gaseous sulphur monochloride ($S_2Cl_2$) which boils at 138° C. However, we have found from our practical investigations that sulphur dichloride is sufficiently stable relative to ferric chloride at elevated temperatures and that equation (2) is in fact a feasible method.

The method for the reduction of ferric chloride in accordance with the present invention is particularly adapted to be the partial dechlorination step in a method for recovering the chlorine values from iron chloride.

Thus, the ferric chloride input to the method summarised in equation (2) preferably derives from a process as disclosed in U.S. Pat. No. 4,140,746 and U.S. patent application No. 37,718, filed Aug. 10, 1979. However, the present invention is not limited to ferric chloride derived from any particular source.

The sulphur monochloride input to the method according to this invention is preferably substantially only $S_2Cl_2$ or is a sulphur chloride the major portion of which is $S_2Cl_2$. However, according to this invention some sulphur dichloride or sulphur may be present in the input together with $S_2Cl_2$. Thus the $S_2Cl_2$ may be used in combination with $SCl_2$ or S. In the latter case, sulphur is converted to $S_2Cl_2$ by reaction with ferric chloride and/or $SCl_2$ prior to the reduction of ferric chloride in accordance with equation (2).

The reaction between sulphur monochloride and ferric chloride is preferably carried out in a fluidised bed of (product) ferrous chloride. The bed temperature is preferably held between the boiling point of sulphur monochloride (138° C.) and 500° C., more preferably between 200° C. and 400° C., and most preferably between 240° C. and 280° C.

Alternatively, a stirred bed reactor or a rotary kiln reactor could be used.

The reaction is preferably carried out continuously.

The sulphur monochloride is preferably introduced to the reactor as a gas, but may also be introduced as a liquid. In which case it is immediately gasified by contact with the hot reaction bed.

The ferric chloride is preferably introduced as a gas to the reactor, but may also be introduced as a solid.

It is preferred to use more sulphur monochloride than is stoichiometrically required as indicated in equation (2) in order to reduce the content of ferric chloride in the offgas. For example, within the most preferred temperature range, a stoichiometric excess of sulphur monochloride of approximately 100% in relation to equation (2) is normally required to produce the ferric chloride content of the offgas to industrially acceptable limits. Thus the offgas from the reduction reactor will contain a mixture of sulphur dichloride and sulphur monochloride, together with some unreacted ferric chloride.

The offgas is preferably condensed to a liquid, centrifuged to remove solid particles (ferric and ferrous chloride). Unless the sulphur chloride product can be recycled directly to a sulpho-chlorination process, it is preferred to pass it to a fractional distillation column to produce a chlorine overhead and an approximately sulphur monochloride bottom product for recycle to the reduction reaction. It is preferred to operate the distillation column at a pressure of about 10 atmospheres with an overhead temperature of between 20° C. and 60° C. and a bottom temperature of between 160° C. and 220° C. such that pure elemental chlorine is produced as the overhead product and a sulphur chloride in which the atomic ratio of sulphur to chlorine is approximately equal is produced as the bottom product. Alternatively, the distillation column may be operated at atmospheric pressure with an overhead temperature of about −40° C. and a bottom temperature of between 100° C. and 140° C.

Another possibility is to react the $S_2Cl_2$ product with carbon disulphide to produce carbon tetrachloride which may be recycled to the carbo-chlorination reaction or sold for other industrial processes; or the $S_2Cl_2$ product may be reacted with carbon monoxide to produce phosgene for recycle to carbo-chlorination or for sale to other industrial processes.

The ferrous chloride bed overflow from the reduction reactor is preferably converted to ferric chloride and ferric oxide by reaction with a controlled quantity of oxygen or air, as disclosed for stage (b) of the process disclosed in U.S. Pat. No. 4,140,746 and U.S. patent application No. 37,718, filed Aug. 10, 1979, relating to the recovery of chlorine values from iron chloride derived from various sources. The resulting ferric chloride is preferably recycled to the reduction reaction which is the subject of the present invention.

The invention is illustrated by the following Examples.

EXAMPLE 1

A 100 mm diameter bed of ferrous chloride powder was fluidised at 260° C. with the following gas mixture:
2.8 l/min ferric chloride gas;
2.4 l/min nitrogen; and
7.0 l/min sulphur chloride gas (S:Cl molar ratio 0.93:1.00)

The ferric chloride and sulphur chloride gases entered the base plate of the fluidisation reactor through separate orifices and hence did not mix prior to entering the bed. The offgas from the reactor was collected and precautions were taken to ensure that any free chlorine was absorbed in the sulphur chloride mixture. Analysis of the offgas gave the following molar fractions:

| $Fe_2Cl_6$ | $S_2Cl_2$ | $SCl_2$ | $N_2$ |
|---|---|---|---|
| 0.004 | 0.262 | 0.540 | 0.194 |

Thus, the sulphur to chlorine atomic ratio of the sulphur chloride offgas can be seen to have fallen to 0.66:1.00 while dechlorinating the input ferric chloride. The ferrous chloride reaction product reported to the fluid bed.

EXAMPLE 2

The procedure of Example 1 was repeated using a fluidising gas mixture as follows:
2.5 l/min ferric chloride
3.7 l/min nitrogen
4.2 l/min sulphur monochloride with sulphur to chlorine atomic ratio of 1.00:1.00

Analysis of the offgas gave the following molar ratios:

| $Fe_2Cl_6$ | $S_2Cl_2$ | $SCl_2$ | $N_2$ |
|---|---|---|---|
| 0.009 | 0.174 | 0.461 | 0.356 |

The S:Cl atomic ratio in the offgas fell to 0.64:1.00 in the offgas.

EXAMPLE 3

The distillation of a chlorine-rich sulphur chloride produced according to equation (2) (although lower in $S_2Cl_2$ than normal) was carried out in a 80 mm diameter Inconel column. The feed rates used were below the capacity of the column since the critical constraint was the heat load on the condenser. Samples were collected for analysis after three hours running time, and the results are given below. The theoretical heats (i.e. the heat input at the bottom and the heat load on the condenser) were up to 50% greater in practice at the feed rates specified.

| | |
|---|---|
| Pressure: | Atmospheric |
| Packing: | 1.6 meters of Knitmesh Multifil packing manufactured by Norton Chemical Process Ltd of England (equivalent to 30 theoretical plates) |
| Location of feed plate: | 60% of packing below and 40% above |
| Theoretical Heat Input of Bottom: | 14 K cal.per mole of feed |
| Heat Load on Condenser: | 8.5 K cal.per mole of feed |
| Feed Analysis: | 90 mole % $SCl_2$ 10% $S_2Cl_2$ |
| Top Product Analysis: | 100% $Cl_2$ (99.7 ± 3%) |
| Bottom Product Analysis: | 100% $S_2Cl_2$ (98 ± 2%) |
| Reflux Ratio: | 3 |
| Feed Rate and Temperature: | 170 moles/hour at 20° C. |
| Chlorine Production Rate + Temperature: | 76 moles/hour at −40° C. |
| Bottom Production Rate + Temperature: | 93 moles/hour at 138° C. |

EXAMPLE 4

The procedure was carried out as described in Example 3, except that a pressure of 10 atmospheres was used, resulting in chlorine being produced as the overhead product at 30° C. and the bottom product at 210° C.

We claim:
1. In a method for the reduction of ferric chloride in the presence of a reducing agent to produce ferrous chloride the improvement which comprises using a reducing agent comprising at least a major portion of sulphur monochloride.

2. A method according to claim 1, wherein the reducing agent consists essentially of sulphur monochloride.

3. The method according to claim 1, wherein the reducing agent comprises a major portion of sulphur monochloride and a minor portion of sulphur dichloride.

4. The method according to claim 1, wherein the reducing agent comprises a major portion of sulphur monochloride and a minor portion of sulphur and wherein the sulphur is converted to sulphur monochloride by reaction with ferric chloride and/or sulphur dichloride prior to reduction of the ferric chloride.

5. The method according to claim 1, wherein the reaction is performed in a fluidised bed of ferrous chloride.

6. The method according to claim 5, wherein the reaction is performed at a temperature of between about the boiling point of sulphur monochloride and about 500° C.

7. The method according to claim 6, wherein the temperature is between about 200° C. and about 400° C.

8. The method according to claim 7, wherein the temperature is between about 240° C. and about 280° C.

9. The method according to claim 5, wherein the ferric chloride and sulphur monochloride are introduced to the fluidised bed in the gaseous state.

10. The method according to claim 1, which further comprises subjecting the ferrous chloride product to an oxidation reaction with an oxidising agent selected from the group consisting of oxygen and oxygen-containing gases to produce ferric chloride and ferric oxide and recycling the resulting ferric chloride to the reduction reaction.

11. The method according to claim 10 wherein the ferric chloride is derived directly or indirectly from an iron chloride by-produced in a process comprising chlorinating a material selected from the group consisting of titaniferous and aluminous materials.

* * * * *